United States Patent [19]

Herb et al.

[11] 4,102,587
[45] Jul. 25, 1978

[54] ANGLE-SHAPED SUPPORT MEMBER

[75] Inventors: Armin Herb, Peissenberg; Erich Leibhard; Raimer Uhlig, both of Munich, all of Germany

[73] Assignee: Hilti Aktiengesellschaft, Schaan, Liechtenstein

[21] Appl. No.: 797,922

[22] Filed: May 18, 1977

[30] Foreign Application Priority Data

May 25, 1976 [DE] Fed. Rep. of Germany ....... 2623476

[51] Int. Cl.² .............................................. F16B 9/00
[52] U.S. Cl. .................................... 403/205; 248/188; 403/191; 403/231; 403/396; 403/397; 403/403
[58] Field of Search ............... 403/205, 396, 397, 231, 403/400, 403, 191; 52/248, 194, 196; 248/188

[56] References Cited

U.S. PATENT DOCUMENTS

| | | | |
|---|---|---|---|
| 1,129,658 | 2/1915 | Foy | 403/205 X |
| 4,014,618 | 3/1977 | Kristiansen | 403/403 X |
| 4,032,242 | 6/1977 | Morris | 403/403 X |

FOREIGN PATENT DOCUMENTS 903,684  8/1962  United Kingdom ................. 403/400

*Primary Examiner*—Werner H. Schroeder
*Assistant Examiner*—Conrad L. Berman
*Attorney, Agent, or Firm*—Toren, McGeady and Stanger

[57] ABSTRACT

An angle-shaped support member consists of a unitary element formed into a pair of legs extending normally to one another and interconnected at their adjacent ends by an outwardly extending rectangularly shaped box section. The opposite ends of the legs from the box section each have an outwardly directed flange. The flanges and walls of the box section have axially aligned openings through which bars can be fitted. The openings in the flanges and walls are offset laterally relative to one another to avoid any interference between the bars which extend through them.

16 Claims, 4 Drawing Figures

ANGLE-SHAPED SUPPORT MEMBER

SUMMARY OF THE INVENTION

The present invention is directed to an angle-shaped support member and, more particularly, it concerns a support member with the legs forming the angle disposed normally to one another and with the ends of the legs spaced outwardly from the other leg having an outwardly projecting flange with openings through which bars can extend.

Angle-shaped support members of the above-mentioned type have an extremely wide range of applications. They can be used, for example, for suspending rectangular pipes, rectangular ducts of various types, section members, platforms and the like. Further, they can be used as corner clamping means in casing constructions, tank constructions and in the construction of temporary buildings. In all of these examples there is the common feature that bars are passed through openings in the flanges which project outwardly from the legs. As a rule, the bars are threaded rods on which nuts can be attached acting as stops for the flanges of the support member.

In the presently known support angles it has been found that they always form a weak point as far as the load is concerned. Due to the relatively short length of the guidance of the bars in the flanges of the support members, extremely high bending stresses occur both in the bars and in the support members, which limit the load capacity of the support member.

Therefore, it is a primary object of the present invention to provide an angle-shaped support member which can be used with high loads.

In accordance with the present invention, the high load capacity is achieved by incorporating a rectangularly shaped box section with the adjacent edges of the legs. The box section projects outwardly away from the intersection of the legs in the direction opposite to which the legs extend. The box section has a pair of walls disposed in parallel and generally aligned with one of the flanges on a support member. Aligned openings are provided through the flange and parallel walls of the box section through which bars can be extended so that the overall length of guidance of the bars is appreciably increased.

The arrangement of the box-shaped section relative to the legs of the support member provides a triple guidance of the bars extending through the openings in the flanges and in the walls of the box-shaped section. As a result, the bending stresses on the support member are limited to a considerable extent, while the legs are afforded additional stiffening by the bars which extend parallel to the legs. Fastening of the support member on the bars can be effected in a known manner whereby stop means, such as a nut, does not act on the flange but on the box section.

To prevent the bars extending parallel to the individual legs from interfering with one another, the openings through the flanges and through the parallel walls of the box section are offset laterally to one another. Accordingly, it is possible to utilize fully the triple guidance for each bar provided by one flange and a pair of parallel walls of the box-shaped section.

Further, the lengths of the bars need not correspond to one another, since their free ends can extend from the support member for any length.

To ensure independent use of the angle-shaped support member embodying the present invention, it is preferable if one of the flanges includes two openings with aligned openings provided in two of the parallel walls of the box-shaped section with the openings being arranged symmetrically relative to the opening through the other flange which is aligned with one opening through each of the other two parallel walls of the box section. With such an arrangement, the range of application of the support members is broadened, since it is unnecessary to distinguish between elements arranged to the right or to the left side. Moreover, the number of openings in the flange and aligned openings in the walls of the box section is irrelevant, it is important only that they are disposed in a symmetrical and offset arrangement relative to the two legs of the support member.

The manner in which the walls of the box section are oriented relative to the legs of the support member is also irrelevant. For manufacturing reasons and also for reasons of appearance, it is preferable if the walls forming the box section are arranged normal to one of the legs and parallel to the other leg. In a preferred embodiment, the box-shaped section is square in cross section.

Another feature of the arrangement of the support member which is influenced primarily by production considerations is the orientation of the flanges with respect to the legs from which they extend. Preferably, the flanges are arranged at right angles to the legs.

In another embodiment of the invention, the flanges can be resilient elements and arranged obliquely to the legs, for example, in an acute or obtuse angle. By providing a corresponding adaptation of the openings through the flanges relative to the openings in the walls of the box section, self-clamping of the support member on the bars extending through the flanges and the box section can be effected, as is already known in the suspension of similar elements. The openings through the flange can have a trapezoidal, drop-shaped or elliptical shape, also as is previously known. The self-clamping action of the support member on the bars can be provided where the bars are threaded or provided with a smooth exterior surface. Where self-clamping is provided, stop means such as nuts, are unnecessary.

As known, the legs of the support member can be provided with openings through which rivets, screws or the like can extend for fastening the parts to be suspended or clamped by the support member. Such openings can be circular or oblong in shape. Further, the legs of the support member can be provided with plastic or fiber coverings to provide insulation or to prevent or dampen vibration noises.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
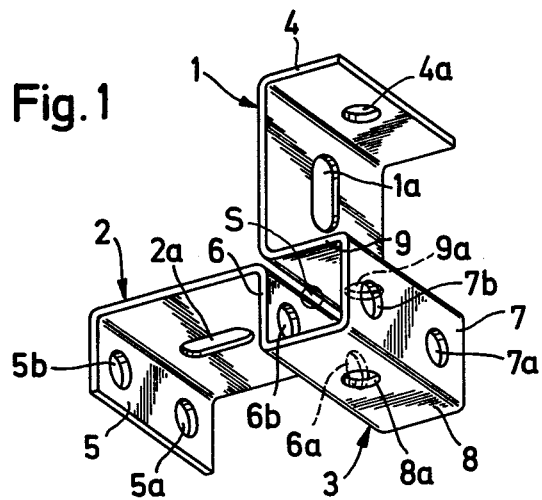
FIG. 1 is a perspective view of a support member embodying the present invention.
Figure 2:
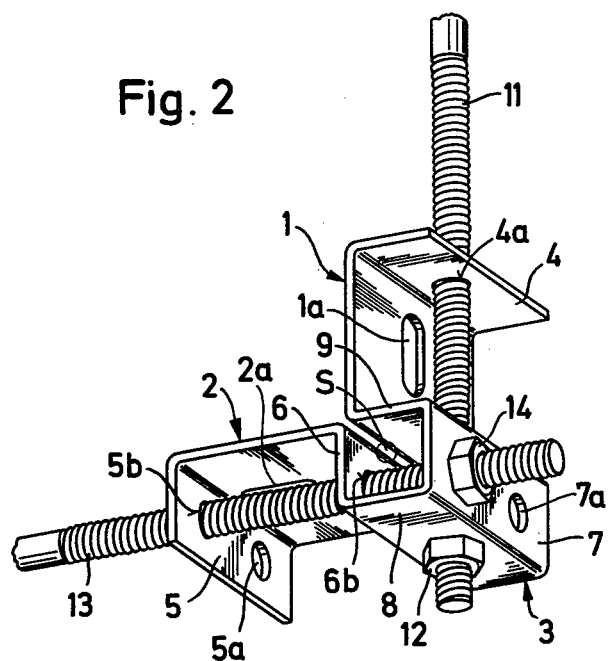
FIG. 2 is a view similar to FIG. 1, illustrating bars extending through the support member.
Figure 3:
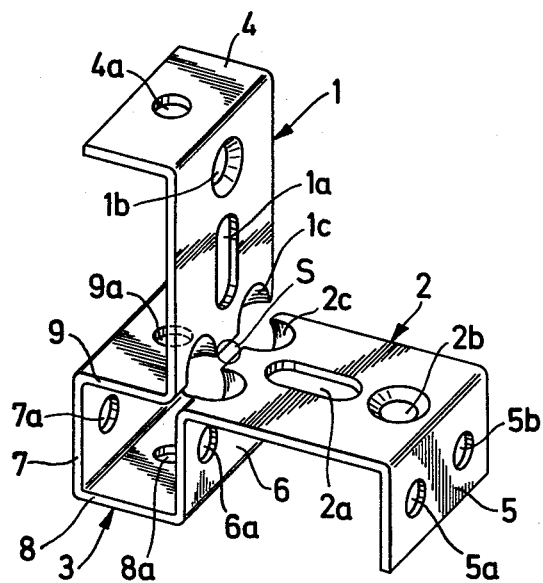
FIG. 3 is a perspective view of another embodiment of a support member incorporating the present invention.

In FIGS. 1, 2 and 3 an angle-shaped support member is illustrated having a pair of legs 1, 2 disposed normally to one another. At the junction S of the legs 1, 2 there is a boxshaped section 3 having a square cross section. As can be seen in these three figures the support member is formed from a single strip with the adjacent edges of the legs 1 and 2 at the junction S being slightly spaced apart. At the opposite end of each of the legs 1, 2 there is a flange 4, 5 extending substantially perpendicularly to the leg. The flanges extend outwardly from the legs in the same direction as the box section extends from the junction S. Flange 5 on leg 2 has a pair of laterally spaced openings 5a, 5b, that is, the openings are spaced apart in the direction in which the intersection between the leg and the flange extends. The box section 3 is formed of two pair of parallel walls 6, 7 and 8, 9. Walls 6, 7 which extend in parallel relation with the flange 5 have openings 6a, 6b and 7a, 7b which are aligned with the openings 5a, 5b in the flange. The flange 4 has a single opening 4a and the walls 8, 9 disposed in parallel with it, each has a single opening 8a, 9a which are aligned with the opening 4a. The openings through the flange 5 and the walls 6 and 7 of the box section are provided symmetrically on opposite sides of the axis through the openings 4a, 9a, 8a in the flange 4 and the walls 9, 8. For the passage of screws, rivets or the like for fastening ducts, pipes and similar members to the legs 1, 2 of the support member, elongated slots 1a are provided in the legs. Further, in FIG. 3, the legs are also provided with chamfered holes 1b, 2b to accept a counter-sunk screw.

In FIG. 2 it indicates how bars are connected to the support member. A bar in the form of a threaded rod, is inserted through the aligned openings 4a, 9a and 8a. As a stop means, the threaded rod or bar 11 carries a nut 12 which bears against the outwardly facing surface of the wall 8 of the box section 3. Another threaded rod or bar 13 extends through the aligned openings 5b, 6b and 7b and a nut 14 is provided on the bar bearing against the outwardly facing surface of the wall 7 of the box section. In the arrangement illustrated in FIG. 2, the openings 5a, 6a and 7a have no supporting function. However, they are provided to receive a corresponding bar if the position of the support member is reversed or inverted.

In FIG. 3 the ends of the legs at the junction S are provided with corrugations 1c, 2c to provide additional reinforcement of the support member.

Figure 4:
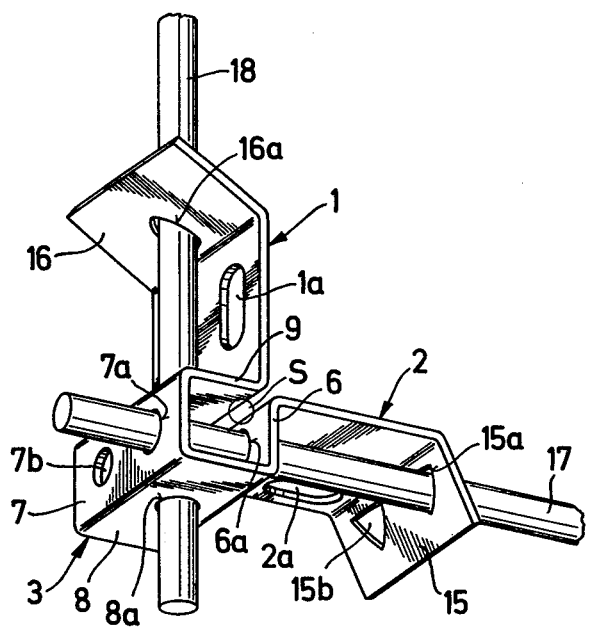
FIG. 4 is a perspective view of still another embodiment of the support member incorporating the present invention and illustrating bars extending through the support member.

In the support member illustrated in FIG. 4, the legs 1, 2 are normal to one another and the box section 3 has a square cross section and extends outwardly from the legs at the location of the junction S. At the opposite ends of the legs from the junction S there are resilient flanges 15, 16 which project at an obtuse angle to the legs. Flange 15 has openings 15a, 15b aligned with openings 6a, 6b and 7a, 7b, respectively, in the parallel walls 6, 7 of the box section 3. Disposed symmetrically with respect to the axes of these aligned openings is an opening 16a in flange 16 and openings 8a, 9a in the walls 8, 9 of the box section 3. As can be noted the openings 16a, 8a, 9a; 15a, 6a, 7a; and 15b, 6b and 7b are in alignment. Because of the perspective representation afforded by FIG. 4, the openings 6b, 9b in the walls 6, 9 of the box section are not visible. Furthermore, openings for rivets, screws and the like through the legs 1, 2 are provided by elongated slots 1a, 2a.

As displayed in FIG. 4, the angle-shaped support member is secured on bars 17, 18 each being a smoothed surfaced round rod. The fastening in this support member is afforded by the clamping action of the flanges 15, 16 and results from their natural resilience. To facilitate the clamping action, openings 15a, 15b and 16a of the flanges 15, 16 are drop-shaped, trapzoidal or triangular.

The angle-shaped support member illustrated in FIG. 4 is shown in reversed position to that in FIG. 2, so that the openings 15b in the flange 15 and the openings 6b, 7b in the walls 6, 7 of the box section have no supporting function.

While specific embodiments of the invention have been shown and described in detail to illustrate the application of the inventive principles, it will be understood that the invention may be embodied otherwise without departing from such principles.

What is claimed is:

1. In an angle-shaped support member having a first leg and a second leg with said first and second legs disposed substantially normal to one another, said first and second legs each having a first end located adjacent to one another and a second end spaced from said first end, a flange located at the second end of each of said first and second legs and extending outwardly from said second end in the direction opposite to the direction in which the other said leg extends from said first end, each of said flanges having at least one opening therethrough for receiving a bar extending therethrough, wherein the improvement comprises a box-shaped section secured to and extending outwardly from each of said first ends of said first and second legs oppositely from the direction extending from the first end to the second end of said legs, said box-like section having a first wall extending outwardly from said first end of said first leg and a second wall extending outwardly from the first end of said second leg, one surface of said first wall facing toward said flange located at the second end of said first leg, one surface of said second wall facing toward said flange located at the second end of said second leg, and at least one other wall interconnecting the ends of said first and said second walls spaced outwardly from the first ends of said legs, said first wall and said at least one other wall having at least one opening extending through each of them and the openings being aligned with the at least one opening in said flange extending from said first leg for receiving therethrough the bar to be received through the at least one opening in the flange on said first leg, said second wall and said at least one other wall having at least one opening extending through each of them and the openings in said second wall and said at least one other wall being aligned with the at least one opening in said flange extending from said second leg for securing therethrough the bar to be received through the at least one opening in the flange on said second leg.

2. In an angle-shaped support member, as set forth in claim 1, wherein said box-like section being rectangularly shaped and said at least one other wall comprising a third wall extending substantially perpendicularly from said first wall and a fourth wall extending substantially perpendicularly from and interconnecting said second wall and said third wall, the openings in said flange from said first leg and in said first and fourth walls being aligned and the openings in said flange from said second leg and in said second and third walls being aligned.

3. In an angle-shaped support member, as set forth in claim 2, wherein the axis of the openings in said flange on said first leg and in said first and fourth walls being offset laterally from the axis of the openings in said flange on said second leg and in said second and third walls.

4. In an angle-shaped support member, as set forth in claim 3, wherein said flange on said second leg having two openings therethrough spaced apart in the direction in which the edge of said flange joined to said second leg extends, said second and third walls each having two openings therethrough spaced apart in the same direction as the openings in said flange on said second leg and each opening in said flange being aligned with one opening in said second and third walls, said flange in said first leg having a single opening therethrough and said first and fourth walls each having a single opening therethrough with the single opening in said flange on said first leg and in said second and third walls being aligned, and the axes of the openings in said flange on said second leg and in said second and third walls being disposed symmetrically on opposite sides of the axis of the openings in said flange on said first leg and in said first and fourth walls.

5. In an angle-shaped support member, as set forth in claim 4, wherein said first, second, third and fourth walls of said box-like section each being disposed parallel to one of said first and second legs and being disposed perpendicularly to the other one of said first and second legs.

6. In an angle-shaped support member, as set forth in claim 5, wherein said box-like section being square in cross section.

7. In an angle-shaped support member, as set forth in claim 5, wherein said flange extending from said first leg is disposed normally thereto and said flange extending from said second leg is disposed normally thereto.

8. In an angle-shaped support member, as set forth in claim 5, wherein said flanges being resilient and extending obliquely relative to the leg to which each is attached.

9. In an angle-shaped support member, as set forth in claim 5, wherein the aligned openings in said flanges and said walls of said box-like section being round.

10. In an angle-shaped support member, as set forth in claim 5, wherein the aligned openings in said flanges and said walls of said box-like section being trapezoidal.

11. In an angle-shaped support member, as set forth in claim 5, wherein the aligned openings in said flanges and said walls of said box-like section being drop-shaped.

12. In an angle-shaped support member, as set forth in claim 5, wherein the aligned openings in said flanges and said walls of said box-like section being substantially triangular.

13. In an angle-shaped support member, as set forth in claim 5, wherein said legs having openings formed therethrough.

14. In an angle-shaped support member, as set forth in claim 5, wherein the interconnecting edges between said legs and said box section being corrugated in the direction extending transversely of the interconnecting edges for effecting reinforcement of the angle-shaped support member.

15. In an angle-shaped support member, as set forth in claim 5, wherein said first ends of said first and second legs being disposed in closely spaced relation.

16. In an angle-shaped support member, as set forth in claim 15 wherein said legs, said flanges and said box-like section being formed as a unitary member.

* * * * *